United States Patent [19]

Keating

[11] Patent Number: 4,607,609
[45] Date of Patent: Aug. 26, 1986

[54] INFRARED BURNER ASSEMBLY FOR A GRIDDLE

[76] Inventor: Richard Keating, 330 Sutton Rd., Barrington Hills, Ill. 60010

[21] Appl. No.: 783,169

[22] Filed: Oct. 2, 1985

[51] Int. Cl.4 .............................................. F24C 3/00
[52] U.S. Cl. ................................ 126/39 J; 126/39 K; 126/39 H; 126/214 D; 126/214 R; 99/422
[58] Field of Search ................. 126/39 H, 39 N, 39 J, 126/39 K, 214 R, 214 D; 99/422

[56] References Cited

U.S. PATENT DOCUMENTS

| | | | |
|---|---|---|---|
| 3,042,110 | 7/1962 | Weber et al. | 126/39 K |
| 3,470,862 | 10/1969 | Darrow et al. | 126/39 J |
| 4,083,355 | 4/1978 | Schwank | 126/39 J |
| 4,390,125 | 6/1983 | Rozzi | 126/92 B X |

Primary Examiner—Randall L. Green
Attorney, Agent, or Firm—Nicholas A. Camasto

[57] ABSTRACT

A griddle includes a thick metal plate having a cooking surface and is heated from below by four infrared gas burner units. A deflector plate is mounted adjacent the outer edge of the two outer burner units and is upwardly bent at about a 45° angle for deflecting infrared energy near the outer edges of the two outer burners toward the outer extremities of the bottom of the plate for producing a uniform surface temperature over the cooking surface.

4 Claims, 3 Drawing Figures

INFRARED BURNER ASSEMBLY FOR A GRIDDLE

BACKGROUND OF THE INVENTION

This invention relates generally to commercial griddles and particularly to a commercial griddle that is heated by means of one or more infrared burners.

Commercial griddles for restaurants and for so-called "fast food" establishments generally comprise relatively thick metal plates that are heated to cooking temperatures from a heat source located below the surface of the griddle. The surface of the griddle may be treated and highly polished to provide a very smooth surface to which foods do not readily adhere. It may also comprise a large mass of material which acts as a heat sink to maintain a relatively constant surface temperature for controlled cooking. One well-known griddle is manufactured and sold by Keating of Chicago, Inc. under the registered trademark Miraclean.

Griddles are generally heated by means of natural gas. Recently, infrared gas burners have been used in connection with commercial space heating equipment. Such burners have either a perforate ceramic element or a spaced stainless steel mesh for providing an essentially flameless heat. Infrared gas burners are convenient, efficient and generally safer than conventional open flame burners, since they operate primarily on the principle of radiant energy rather than heating by conduction or convection. While the prior art has utilized infrared burners as space heaters and as industrial heaters, these burners have not found extensive use in commercial cooking equipment. In particular, such burners have not been used as the heating elements for griddles.

OBJECTS OF THE INVENTION

In accordance with the invention, there is provided a commercial griddle that is heated by means of infrared gas burners that include deflection means for upwardly directing radiation at the sides of the burners. It is therefore a principal object of the invention to provide a novel griddle.

Another object of the invention is to provide a griddle having a uniformly heated surface.

BRIEF DESCRIPTION OF THE DRAWING

These and other objects of the invention will be apparent upon reading the following description in conjunction with the drawing in which.

DESCRIPTION OF THE PREFERRED EMBODIMENT

Figure 1:
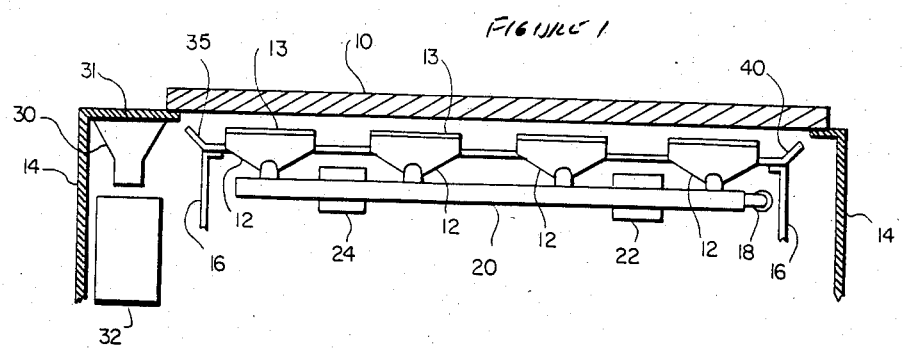
FIG. 1 represents a partial schematic cross section of a griddle constructed in accordance with the invention.
Figure 2:
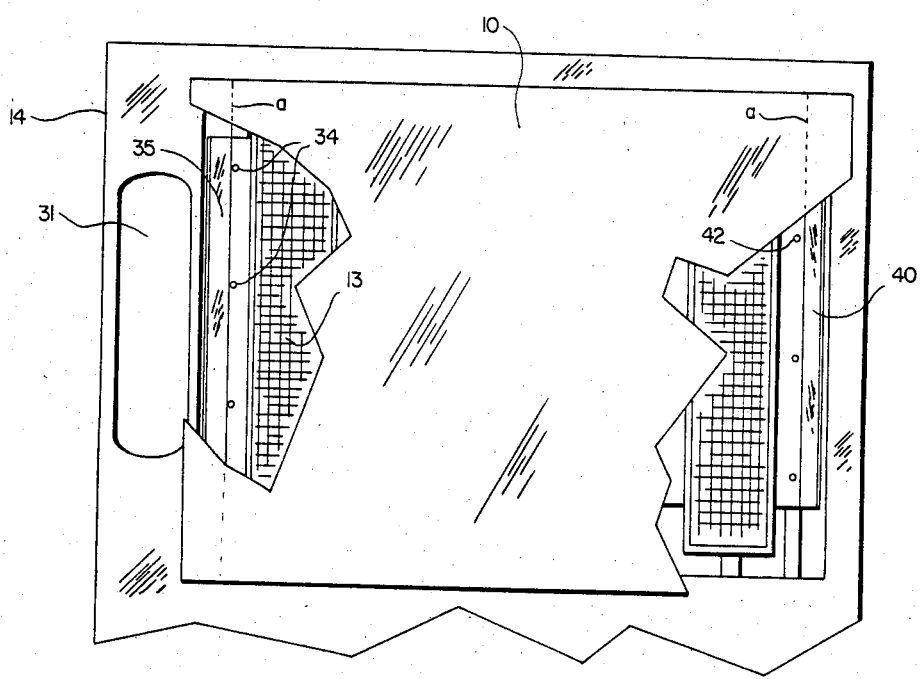
FIG. 2 is a partial top view of the griddle of FIG. 1 with portions broken away.

A griddle constructed in accordance with the invention includes a thick metal slab comprising a griddle plate 10, as best shown in FIGS. 1 and 2, that is heated on its underside by a plurality of infrared gas burners 12. Griddle plate 10 may be held in position, by any convenient and well-known support means, on a surrounding metallic cabinet structure 14. It will be appreciated that the supports in cabinet structure 14 may, if desired, be fitted to a larger structure. Similarly, a burner supporting structure 16 is mounted in any convenient manner for supporting the plurality of burners 12 in a fixed position beneath griddle plate 10. A gas inlet 18 is connected to a manifold or large storage pipe 20 from whence a pair of regulators 22 and 24 is supplied with gas, under controlled pressure, for distribution to burners 12. The means for supplying gas to burners 12 are well known in the art, and they are therefore omitted from the illustrations for the purposes of clarity. These means form no part of the present invention.

As best seen in FIG. 2, supporting cabinet structure 14 has an opening 31 formed in its top surface with a depending funnel-like portion 30 that opens into a retainer 32. Opening 31 is thus useful as a grease and other waste disposal area. During the cooking process, accumulated grease and burned foods or other food scraps may be disposed of by the cook by scraping them off of the surface of the griddle plate 10 with a spatula or the like and into waste container 32 for later removal.

Each gas burner includes an element 13 for generating infrared energy from the gas. While the element 13 may comprise a ceramic block with a plurality of small apertures, in the preferred embodiment, element 13 comprises a flat wire mesh of stainless steel. The details of the gas burner are not part of the present invention, and any well-known infrared gas burner construction will suffice.

Figure 3:
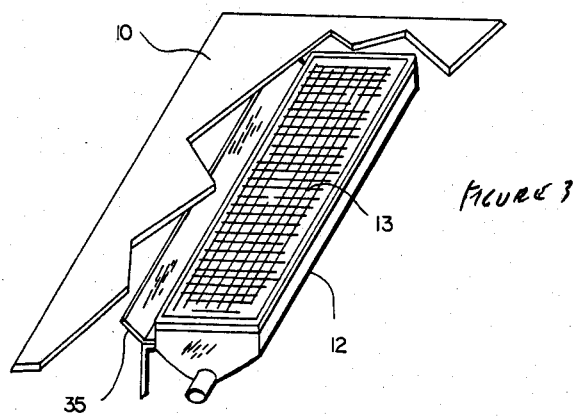
FIG. 3 is a partial broken away perspective view of a portion of the griddle of FIG. 1.

At the outer edges of each of the outer ones of burners 12, there is provided a deflector plate in accordance with the invention. Deflector plates 35 and 40 may simply consist of long metal strips, of approximately the same gauge as the supporting structure 16. The plates are bolted, or otherwise affixed, to supporting structure 16 at points 34 and 42 and upwardly bent to deflect radiant energy at the sides of the respective burners 12 toward the outer bottom portion of griddle plate 10. The burners do not extend out to the side edges of the griddle plate and the result is that the edges of the griddle plate are insufficienly heated. Further, radiant energy at the sides of the outer burners tends to heat cabinet structure 14, which is not a desirable condition. The deflector plates are upwardly angled at about 45° to direct radiant energy upwardly toward the normally non-heated areas of the griddle plate. Thus radiant energy from the outer sides of the two end burners and radiant energy, directly or indirectly emanating from other burners towards the sides of supporting structure 16 and which would otherwise heat the cabinet walls or other surrounding structure, is channeled to the griddle plate. By directing this otherwise "wasted" radiant energy toward the areas of the griddle plate that are normally not juxtaposed to a burner surface, a more uniform temperature distribution is obtained across the surface of the griddle plate. Additionally, the recaptured energy contributes to the efficiency of the system and also helps to prevent the sides of supporting structure 16, which may be the outer walls of a cabinet housing, from becoming excessively warm. FIG. 3 discloses generally how each deflector is positioned with respect to its associated burner.

In griddle plates that are not fitted with deflector plates 35 and 40, a noticeably lower temperature exists within about two inches of the outer edges thereof. These areas are indicated by dashed lines "a". For example, with a 510° F. normal griddle surface temperature, the temperatures in the dashed line areas "a" were approximately 30 to 40 degrees lower. This of course is not a desirable condition since the entire griddle surface should be available for cooking. Foods placed adjacent to the edges of the griddle plate without the deflector plates may therefore undesirably be subjected to varying degrees of cooking. It was also noted that, without the deflector plates of the invention, the cabinet walls adjacent the outside burners were subjected to sufficiently high temperatures to discolor or burn the paint thereon. After the installation of the deflector plates, a substantially uniform surface temperature was attained and the entire griddle surface was available for cooking. In addition, the outside walls of the cabinet were not subjected to paint damaging temperatures.

What has been described is a novel griddle that is uniformly heated with infrared burners by means of added side deflectors. It is recognized that numerous modifications and changes in the described embodiment of the invention will be apparent to those skilled in the art without departing from its true spirit and scope. The invention is to be limited only as defined in the claims.

What is claimed is:

1. A griddle comprising:

A metal slab having a generally rectangular shaped surface adapted for cooking foods thereon;

support cabinet means for said slab;

infrared burner means located below said slab in close proximity thereto for heating said surface to a uniform cooking temperature, said infrared burner means forming a radiant array having a surface area substantially equal to the area of said rectangular shaped surface and having exterior sides that are inwardly disposed from the edges of said slab; and deflector means mounted adjacent to said inwardly disposed sides of said infrared burner means and extending outwardly substantially to the edges of said slab.

2. The griddle of claim 1 wherein said deflector means comprise metal plates.

3. The griddle of claim 2 wherein said metal plates include upwardly angled portions for deflecting radiant energy at the sides of said infrared burner means upwardly toward the edges of said slab to assist in bringing said edges to said uniform temperature and wherein said deflector means are mounted to said support cabinet means.

4. A cooking griddle comprising:

a large rectangular shaped heat retaining metal slab having a cooking surface thereon;

a support structure for supporting said slab in a horizontal position;

a plurality of infrared burners forming a radiant array positioned beneath the bottom of said slab in close proximity to the under surface thereof for heating the top surface of said slab to a uniform cooking temperature, the area of said radiant array being substantially equal to the area of said slab, the two outer ones of said infrared burners being inwardly disposed respectively from the closest adjacent edge of said slab; and a pair of metal deflector plates mounted to said support structure adjacent said two outer infrared burners, said deflector plates being upwardly angled at about a 45 degree angle for directing infrared energy near the sides of said two outer infrared burners toward the outer edges of the bottom of said slab, whereby the temperature over the entire area of said cooking surface is substantially uniform.

* * * * *